United States Patent
Chueh et al.

(10) Patent No.: US 9,317,105 B2
(45) Date of Patent: Apr. 19, 2016

(54) METHOD FOR PERFORMING APPLICATION WAKE-UP MANAGEMENT FOR A PORTABLE DEVICE BY CLASSIFYING ONE APPLICATION WAKE-UP EVENT OF A PLURALITY OF APPLICATION WAKE-UP EVENTS AS A TRIGGERING EVENT FOR THE OTHER APPLICATION WAKE-UP EVENTS

(71) Applicant: HTC Corporation, Taoyuan County (TW)

(72) Inventors: Hsin-Ti Chueh, Taoyuan County (TW); Chen-Huang Fan, Taoyuan County (TW); Chien-Nan Lin, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 323 days.

(21) Appl. No.: 14/019,565

(22) Filed: Sep. 6, 2013

(65) Prior Publication Data
US 2014/0195839 A1 Jul. 10, 2014

Related U.S. Application Data

(60) Provisional application No. 61/750,359, filed on Jan. 9, 2013.

(51) Int. Cl.
*G06F 9/46* (2006.01)
*G06F 1/32* (2006.01)

(52) U.S. Cl.
CPC .............. *G06F 1/329* (2013.01); *G06F 1/3203* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 5,625,821 A * | 4/1997 | Record | .................. | G06F 9/542 718/100 |
| 7,047,031 B2 * | 5/2006 | Rosen | ..................... | H04M 3/42 455/518 |
| 7,386,707 B2 * | 6/2008 | Kurata | .................. | G06F 9/3851 712/218 |
| 8,020,025 B2 * | 9/2011 | Hyatt | ..................... | G06F 1/3203 713/320 |
| 2004/0171400 A1 * | 9/2004 | Rosen | ..................... | H04M 3/42 455/518 |
| 2010/0088532 A1 * | 4/2010 | Pollock | ................. | G06F 1/1626 713/324 |

* cited by examiner

*Primary Examiner* — Van Nguyen
(74) *Attorney, Agent, or Firm* — Winston Hsu; Scott Margo

(57) ABSTRACT

A method and apparatus for performing wake-up event management and an associated computer program product are provided, where the method is applied to an electronic device. The method includes the steps of: classifying a plurality of wake-up events of the electronic device according to at least one predetermined rule, wherein a specific wake-up event of the plurality of wake-up events is classified to be a triggering event, and one or more other wake-up events of the plurality of wake-up events are classified to be grouping events; arranging the grouping events as a group corresponding to the triggering event by setting wake-up time of each of the grouping events to be equivalent to that of the triggering event, for triggering the grouping events by utilizing the triggering event; and when the wake-up time of the triggering event is reached, performing operations corresponding to the triggering event and the grouping events, respectively.

17 Claims, 6 Drawing Sheets

| Name | Sub_name | Wake-up event type |
|---|---|---|
| APP1_name | ID1 | ET2 |
| APP1_name | ID2 | ET1 |
| APP2_name | X | ET2 |
| APP3_name | X | ET3 |
| APP4_name | X | ET4 |

FIG. 6

METHOD FOR PERFORMING APPLICATION WAKE-UP MANAGEMENT FOR A PORTABLE DEVICE BY CLASSIFYING ONE APPLICATION WAKE-UP EVENT OF A PLURALITY OF APPLICATION WAKE-UP EVENTS AS A TRIGGERING EVENT FOR THE OTHER APPLICATION WAKE-UP EVENTS

CROSS REFERENCE TO RELATED APPLICATIONS

This application claims the benefit of U.S. Provisional Application No. 61/750,359, which was filed on Jan. 9, 2013, and is included herein by reference.

BACKGROUND OF THE INVENTION

1. Field of the Invention

The present invention relates to alarm grouping of a portable electronic device, and more particularly, to a method for performing wake-up event management, and to an associated apparatus and an associated computer program product.

2. Description of the Prior Art

A conventional portable electronic device implemented according to the related art, such as a multifunctional mobile phone equipped with personal digital assistant (PDA) functionalities or a PDA equipped with mobile phone functionalities, may have become an important part of everyday life since it is very helpful. In a situation where the user installs various types of applications in the conventional portable electronic device, some problems may occur. For example, plenty of wake-up events may be created due to some of the applications, and the conventional portable electronic device may be woken from power saving mode (e.g. a processor of electronic device is woken from suspend/sleep/idle mode) multiple times to perform some operations considered unimportant, respectively, causing the waste power consumption of the conventional portable electronic device to be increased. According to the related art, some conventional methods are proposed, in order to solve the problem. However, further problems such as some side effects are introduced. For example, the conventional methods may cause disorder of a set of periodic wake-up events. More particularly, one of the conventional methods may use a periodic wake-up event of a first set of periodic wake-up events whose period should be equal to a first predetermined value to trigger a periodic wake-up event of a second set of periodic wake-up events whose period should be equal to a second predetermined value that is different from the first predetermined value, causing the period of the second set of periodic wake-up events to erroneously become the first predetermined value. Thus, a novel method is required for providing optimized timing control of wake-up events of an electronic device.

SUMMARY OF THE INVENTION

It is therefore an objective of the claimed invention to provide a method for performing wake-up event management, and to provide an associated apparatus and an associated computer program product, in order to solve the above-mentioned problems.

It is another objective of the claimed invention to provide a method for performing wake-up event management, and to provide an associated apparatus and an associated computer program product, in order to provide optimized timing control of wake-up events of an electronic device.

According to at least one preferred embodiment, a method for performing wake-up event management is provided, where the method is applied to an electronic device. The method comprises the steps of: classifying a plurality of wake-up events of the electronic device according to at least one predetermined rule, wherein a specific wake-up event of the plurality of wake-up events is classified to be a triggering event, and one or more other wake-up events of the plurality of wake-up events are classified to be grouping events; arranging the grouping events as a group corresponding to the triggering event by setting wake-up time of each of the grouping events to be equivalent to that of the triggering event, for triggering the grouping events by utilizing the triggering event; and when the wake-up time of the triggering event is reached, performing operations corresponding to the triggering event and the grouping events, respectively.

According to at least one preferred embodiment, an apparatus for performing wake-up event management is also provided, where the apparatus comprises at least one portion of an electronic device. The apparatus comprises a wake-up control circuit, and further comprises a processing circuit coupled to the wake-up control circuit. The wake-up control circuit is arranged to wake up the electronic device according to at least one wake-up event, and the processing circuit is arranged to control operations of the electronic device. The processing circuit is further arranged to classify a plurality of wake-up events of the electronic device according to at least one predetermined rule, wherein a specific wake-up event of the plurality of wake-up events is classified to be a triggering event, and one or more other wake-up events of the plurality of wake-up events are classified to be grouping events. In addition, the processing circuit arranges the grouping events as a group corresponding to the triggering event by setting wake-up time of each of the grouping events to be equivalent to that of the triggering event, for triggering the grouping events by utilizing the triggering event. Additionally, when the wake-up time of the triggering event is reached, the processing circuit performs operations corresponding to the triggering event and the grouping events, respectively.

According to at least one preferred embodiment, a computer program product is also provided, where the computer program product has program instructions for instructing a processor of an electronic device to perform a method comprising the steps of: classifying a plurality of wake-up events of the electronic device according to at least one predetermined rule, wherein a specific wake-up event of the plurality of wake-up events is classified to be a triggering event, and one or more other wake-up events of the plurality of wake-up events are classified to be grouping events; arranging the grouping events as a group corresponding to the triggering event by setting wake-up time of each of the grouping events to be equivalent to that of the triggering event, for triggering the grouping events by utilizing the triggering event; and when the wake-up time of the triggering event is reached, performing operations corresponding to the triggering event and the grouping events, respectively.

It is an advantage of the present invention that the aforementioned method, the aforementioned apparatus, and the aforementioned computer program product can save power consumption of the electronic device, and therefore the user of the electronic device can utilize the electronic device for a long time between two battery charging operations. In addition, the aforementioned method, the aforementioned apparatus, and the aforementioned computer program product can provide optimized timing control of wake-up events of the electronic device, and therefore can save power of the electronic device without affecting the user's feeling. Additionally, the related art problems (e.g. the conventional portable electronic device may be woken multiple times to perform some operations considered unimportant, respectively, or the conventional methods may cause disorder of a set of periodic wake-up events) can be prevented.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 illustrates a table involved with the method shown in FIG. 3 according to an example.

DETAILED DESCRIPTION

Figure 1:
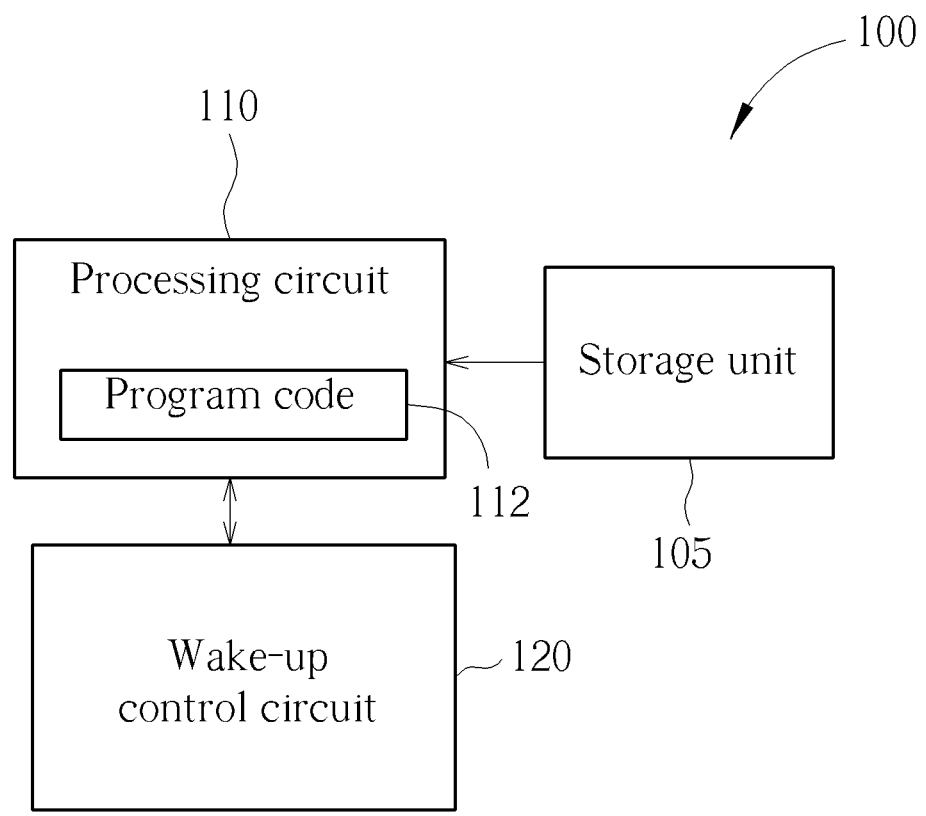
FIG. 1 is a diagram of an apparatus for performing wake-up event management according to an example.

Please refer to FIG. 1, which illustrates a diagram of an apparatus 100 for performing wake-up event management according to an example, where the apparatus 100 may comprise at least one portion (e.g. a portion or all) of an electronic device. For example, the apparatus 100 may comprise a portion of the electronic device mentioned above, and more particularly, can be a main control circuit such as an integrated circuit (IC) within the electronic device. In another example, the apparatus 100 can be the whole of the electronic device mentioned above. Examples of the electronic device may include, but not limited to, a mobile phone (e.g. a multifunctional mobile phone), a mobile computer (e.g. tablet computer), a personal digital assistant (PDA), and a personal computer such as a laptop computer or desktop computer.

As shown in FIG. 1, the apparatus 100 comprises a storage unit 105, a processing circuit 110, and a wake-up control circuit 120. According to this example, the storage unit 105 is arranged to store information for the electronic device, the processing circuit 110 is arranged to control operations of the electronic device, and the wake-up control circuit 120 is arranged to wake up the electronic device according to at least one wake-up event (e.g. the so-called "alarm" in some types of systems). For example, when the electronic device (except for the wake-up control circuit 120 therein) suspends, the wake-up control circuit 120 can be utilized for waking up the electronic device according to the aforementioned at least one wake-up event at the corresponding wake-up time, so the electronic device may resume from the suspend mode thereof. This is for illustrative purposes only, and is not meant to be a limitation. In some examples, when the electronic device enters a power saving state, the wake-up control circuit 120 can be utilized for waking up the electronic device according to the aforementioned at least one wake-up event at the corresponding wake-up time, so the electronic device may recover from the power saving state thereof, where examples of the power saving state may include, but not limited to, Suspend, Sleep, Idle, Wait For Interrupt (SWFI), Temperature-Compensated Crystal Oscillator (TCXO) shutdown, and power collapse state of the electronic device or a processor (or the processing circuit 110 in some examples) of the electronic device. Please note that the processing circuit 110 can be selectively implemented with the mixed scheme utilizing software (or firmware) module running on hardware circuit(s), or implemented with the pure hardware scheme. For example, the processing circuit 110 may comprise the processor and associated hardware circuits implemented by using at least one printed circuit board (PCB) on which the processor can be installed, and the storage unit 105 may comprise at least one memory such as at least one random access memory (RAM) and/or at least one non-volatile memory (e.g. an electrically erasable programmable read only memory (EEPROM) or a Flash memory), where the program code 112 may be stored in the storage unit 105 in advance and retrieved by the processing circuit 110, for running on the processing circuit 110 as illustrated in FIG. 1. This is for illustrative purposes only, and is not meant to be a limitation. In another example, the processing circuit 110 may be implemented as pure hardware circuit(s), where the program code 112 is imbedded therein.

According to this example, the processing circuit 110 (more particularly, the processing circuit 110 executing the program code 112 such as an application, an operating system or a driver) is capable of performing classifying operations on wake-up events of the electronic device and selectively grouping some wake-up events to be triggered by one of those classified as triggering events. As the processing circuit 110 may determine whether to adjust the wake-up time of a wake-up event according to the characteristics of a program module (e.g. an application, a task, etc.) corresponding to this wake-up event, the processing circuit 110 may selectively adjust the wake-up time of one or more of the wake-up events according to the characteristics of the program modules (e.g. applications, tasks, etc.) respectively corresponding to the wake-up events. As a result, the goal of optimized timing control of wake-up events of the electronic device can be achieved.

Figure 2:
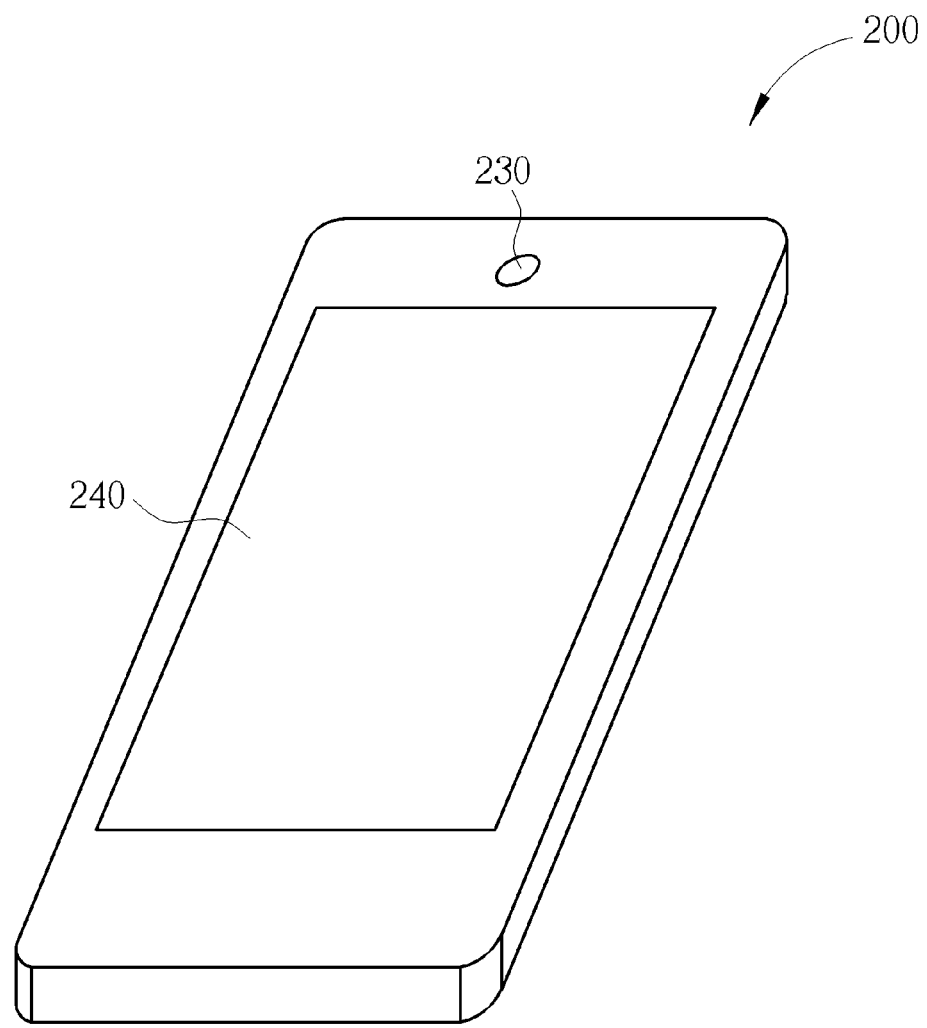
FIG. 2 illustrates some implementation details of the apparatus shown in FIG. 1 according to an example, where the apparatus of this example is a mobile phone.

FIG. 2 illustrates some implementation details of the apparatus 100 shown in FIG. 1 according to an example, where the apparatus of this example is a mobile phone 200 equipped with a camera module 230 and a touch-sensitive display panel 240. For example, the touch-sensitive display panel 240 may comprise a liquid crystal display (LCD) module, and may comprise a transparent touch-control panel integrated into the LCD module. This is for illustrative purposes only, and is not meant to be a limitation.

Figure 3:
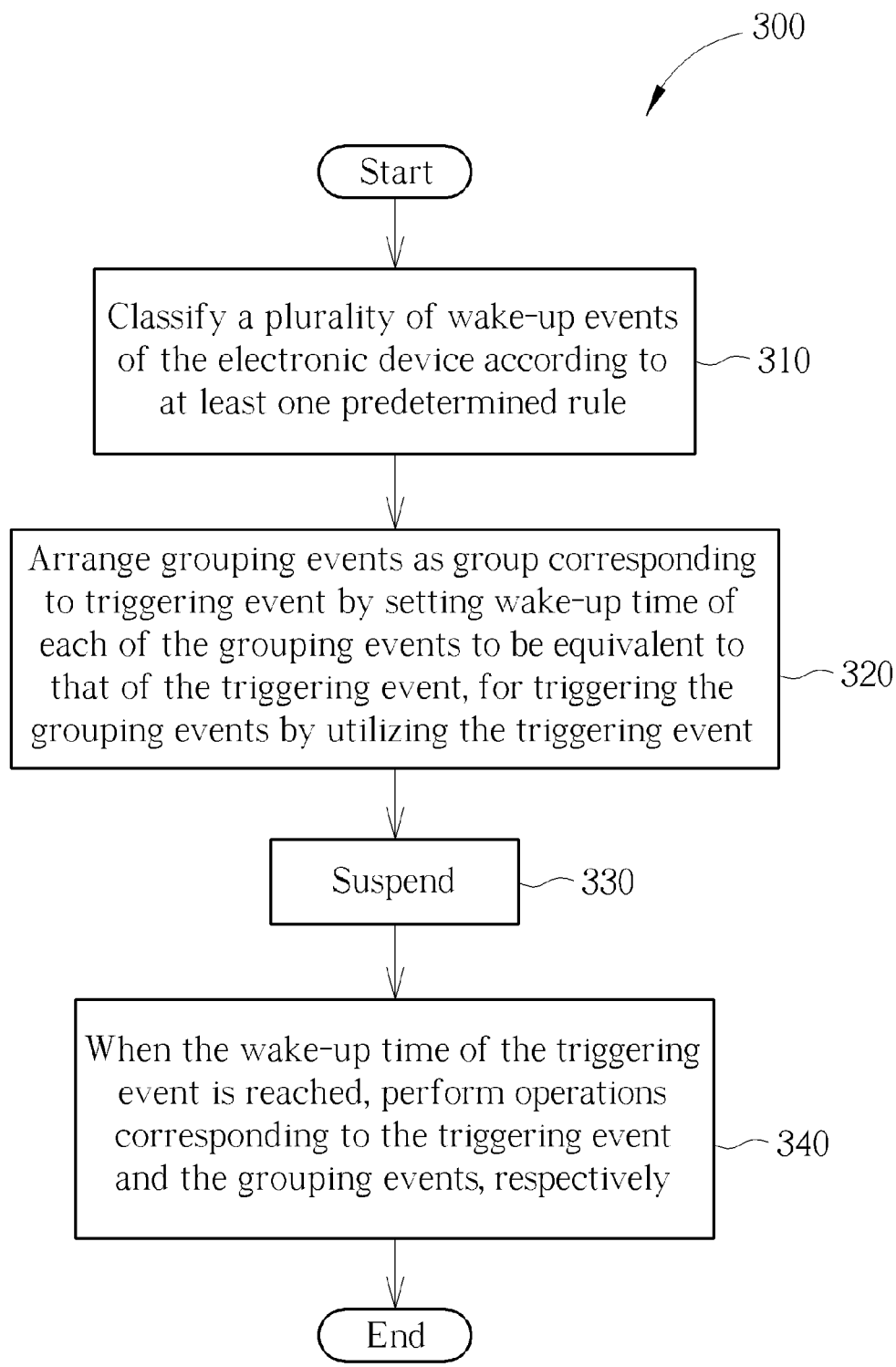
FIG. 3 illustrates a flowchart of a method for performing wake-up event management according to an example.

FIG. 3 illustrates a flowchart of a method 300 for performing wake-up event management according to an example. The method shown in FIG. 3 can be applied to the apparatus 100 shown in FIG. 1 (more particularly, the mobile phone 200 of the example shown in FIG. 2), and can be applied to the processing circuit 110 thereof (more particularly, the processing circuit 110 executing the program code 112 such as the application, the operating system or the driver mentioned above). For example, the program code 112 may be provided through a computer program product having program instructions for instructing a processor such as that mentioned above to perform the method 300 shown in FIG. 3, where the computer program product may be implemented as a non-transitory computer-readable medium (e.g. a floppy disk or a compact disc-read only memory (CD-ROM)) storing the program instructions or an equivalent version thereof, such as a software package for being installed. The method is described as follows.

In Step 310, the processing circuit 110 classifies a plurality of wake-up events of the electronic device according to at least one predetermined rule. For example, a specific wake-up event of the plurality of wake-up events is classified to be a triggering event, and one or more other wake-up events of the plurality of wake-up events are classified to be grouping events.

In Step 320, the processing circuit 110 arranges the grouping events as a group corresponding to the triggering event by setting the wake-up time of each of the grouping events mentioned in Step 310 (i.e. those classified to be grouping events within the plurality of wake-up events) to be equivalent to that of the triggering event, for triggering the grouping events by utilizing the triggering event.

In Step 330, the electronic device (except for the wake-up control circuit 120 therein) suspends, where the wake-up control circuit 120 can be utilized for waking up the electronic device according to the aforementioned at least one wake-up event such as the triggering event mentioned above. As a result, the electronic device can be woken at the wake-up time of the triggering event.

In Step 340, when the wake-up time of the triggering event is reached (e.g. in a situation where the electronic device is woken by the triggering event), the processing circuit 110 performs operations corresponding to the triggering event and the grouping events, respectively. For example, the triggering event and the grouping events may be created for different applications (APPs) running on the electronic device, respectively, and when the wake-up time of the triggering event is reached (e.g. in a situation where the electronic device is woken by the triggering event), the processing circuit 110 performs the operations scheduled for these applications in response to the triggering event and the grouping events, respectively. In another example, the triggering event and the grouping events may be created for at least one application (APP) running on the electronic device, and when the wake-up time of the triggering event is reached (e.g. in a situation where the electronic device is woken by the triggering event), the processing circuit 110 performs the operations scheduled for the aforementioned at least one application in response to the triggering event and the grouping events, respectively.

Please note that, for example, the aforementioned at least one predetermined rule may make a plurality of timing-sensitive wake-up events be classified as triggering events, respectively, where the plurality of timing-sensitive wake-up events may comprise software wake-up events and/or hardware wake-up events. The software wake-up events may comprise wireless communication events created by software applications such as events to synchronize electronic mails (emails), calendar, task and Global Positioning System (GPS) locations from remote server through wireless communication (e.g. General Packet Radio Service (GPRS), GPS, Wideband Code Division Multiple Access (WCDMA), Code Division Multiple Access (CDMA), Evolution-Data Optimized (EVDO), Long Term Evolution (LTE), Wireless Fidelity (Wi-Fi), Worldwide Interoperability for Microwave Access (WiMAX), Bluetooth (BT)), and a display on event that the user turns on the touch-sensitive display panel 240 from suspend state. The hardware wake-up events may comprise hardware interrupt events to notice the processor of the electronic device, such as wireless communication network receiver (RX) traffic events, sensor events, and human-machine interaction events, etc. In some variations of this example, the plurality of timing-sensitive wake-up events may comprise at least one of a wireless communication event (e.g. one of the wireless communication events mentioned above), a display on event such as that mentioned above, and a hardware interrupt event (e.g. one of the hardware interrupt events mentioned above). According to this example, the specific wake-up event can be one of the plurality of timing-sensitive wake-up events. In addition, each of the grouping events may not be one of the plurality of timing-sensitive wake-up events. More particularly, each of the grouping events can be a non-timing-sensitive wake-up event. As the wake-up events of the electronic device can be classified, the characteristics of the program modules (e.g. the applications, the tasks, etc.) respectively corresponding to the wake-up events can be taken into consideration, and the processing circuit 110 may selectively adjust the wake-up time of one or more of the wake-up events according to the characteristics of the program modules (e.g. the applications, the tasks, etc.) respectively corresponding to the wake-up events. As a result of the grouping operation in Step 320, the wake-up time of the grouping events is merged, and the operations respectively corresponding to the triggering event and the grouping events are queued to be performed at the same time. Therefore, the electronic device will not be woken frequently by every single separated event, and unnecessary additional power consumption can be prevented, where the goal of optimized timing control of wake-up events of the electronic device can be achieved.

In practice, no matter whether at least one portion (e.g. a portion or all) of the grouping events is created before or after the triggering event is created, the implementation of the method will not be hindered. For example, in a situation where a specific grouping event of the grouping events is created after the triggering event is created, when the specific grouping event is created, the processing circuit 110 may directly set the wake-up time of the specific grouping event to be equivalent to that of the triggering event. In another example, in a situation where a specific grouping event of the grouping events is created before the triggering event is created, when the triggering event is created, the processing circuit 110 may change the wake-up time of the specific grouping event to be equivalent to that of the triggering event.

In addition, the operations disclosed in the method shown in FIG. 3 may be duplicated for different groups, respectively. For example, another wake-up event of the plurality of wake-up events can be classified to be another triggering event, and the processing circuit 110 may group one or more other grouping events as another group corresponding to the other triggering event by setting the wake-up time of each of the aforementioned one or more other grouping events to be equivalent to that of the other triggering event, for triggering the aforementioned one or more other grouping events by utilizing the other triggering event. More particularly, when the wake-up time of the other triggering event is reached (e.g. in a situation where the electronic device is woken by the other triggering event), the processing circuit 110 may perform operations corresponding to the other triggering event and the aforementioned one or more other grouping events, respectively.

As disclosed above, a wake-up event may be classified as a triggering or a grouping event. This is for illustrative purposes only, and is not meant to be a limitation. In another example, another wake-up event of the plurality of wake-up events may be classified to be a non-grouping event. More particularly, the non-grouping event is not associated with the group corresponding to the triggering event, and is not associated with any other group corresponding to another triggering event. In other words, the non-grouping event is an event that works as original behavior to wake up the electronic device. When the wake-up time of the non-grouping event is reached (e.g. in a situation where the electronic device is woken by the non-grouping event), the processing circuit 110 may perform an operation corresponding to the non-grouping event. For example, the processing circuit 110 may classify some wake-up events as non-grouping events when they are not suitable for grouping for some reasons.

Additionally, in a situation where the triggering event mentioned in Step 320 is selected, the processing circuit 110 may select some neighboring wake-up events of the triggering event as the grouping events mentioned in Step 320. For example, the processing circuit 110 may check whether a wake-up time of a specific grouping event of the grouping events is scheduled within a predetermined time interval corresponding to the wake-up time of the triggering event. Noticeably the wake-up time of a specific grouping event within the predetermined time interval may be originally scheduled prior to or later than the wake-up time of the triggering event. When it is detected that the wake-up time of the specific grouping event is scheduled within the predetermined time interval, the processing circuit 110 may reschedule the wake-up time of the specific grouping event to be equivalent to that of the triggering event. More particularly, the wake-up time of the triggering event is within the predetermined time interval. In some situations, the predetermined time interval can be centered at the wake-up time of the triggering event. This is for illustrative purposes only, and is not meant to be a limitation. In another example, the predetermined time interval is not centered at the wake-up time of the triggering event.

As disclosed above, the plurality of timing-sensitive wake-up events may comprise the software wake-up events and/or the hardware wake-up events. For the software wake-up events, if one (or more) of these software wake-up events is created to synchronize information through wireless communication (e.g. GPRS, GPS, WCDMA. LTE, Wi-Fi, WiMAX, Bluetooth), a corresponding wireless communication chipset may need to be turned on to synchronize with remote server. Once the synchronization is finished, the corresponding wireless communication chipset may need to be turned off. Since turning on/off any of wireless communication chipsets would be power consuming, selecting an event which requires wireless communication to be the trigger event may be considered. This dramatically saves power consumption of the electronic device when multiple grouping events which also require wireless communication are scheduled to the same time of the trigger event since the wireless communication chipset only needs to be turned on/off one time while the trigger event and corresponding grouping events are performed at the same time. For example, in a situation where the plurality of timing-sensitive wake-up events comprises the software wake-up events, the triggering event mentioned above and at least one grouping event of the grouping events mentioned above can be wireless communication events that need to synchronize information through wireless communication.

Unlike the software wake-up events, the hardware wake-up events which may be caused by hardware interrupt signals are usually unpredictable. As a result, grouping event(s) may be merged into a specific hardware wake-up event only while the specific hardware wake-up event is triggered and performed. For example, when the user presses a power key of the electronic device to turn on the touch-sensitive display panel 240, the processing circuit 110 determines whether any wake-up time of the specific grouping event is scheduled later than the specific hardware wake-up event and within the predetermined time interval. If a wake-up time of the specific grouping event is scheduled later than the specific hardware wake-up event and within the predetermined time interval, the processing circuit 110 may reschedule the wake-up time of the specific grouping event to be equivalent to that of the specific hardware wake-up event (i.e. the triggering event in this example). In practice, since the predetermined time interval is limited in a range, a grouping event(s) might not be merged into the triggering event if the grouping event(s) is scheduled out of the predetermined time interval range. In this condition, the grouping event(s) may behave as the non-grouping event. In other words, the grouping event(s) may perform the corresponding event according to the original wake-up time. For example, the triggering event can be a hardware wake-up event such as the aforementioned specific hardware wake-up event, and the processing circuit 110 determines whether any wake-up time of one of the grouping events, such as the specific grouping event of the grouping events, is scheduled later than the triggering event (e.g. the specific hardware wake-up event) and within the predetermined time interval corresponding to the wake-up time of the triggering event. When the wake-up time of the specific grouping event is scheduled later than the triggering event (e.g. the specific hardware wake-up event) and within the predetermined time interval, the processing circuit 110 reschedules the wake-up time of the specific grouping event to be equivalent to that of the triggering event (e.g. the specific hardware wake-up event).

Figure 4:
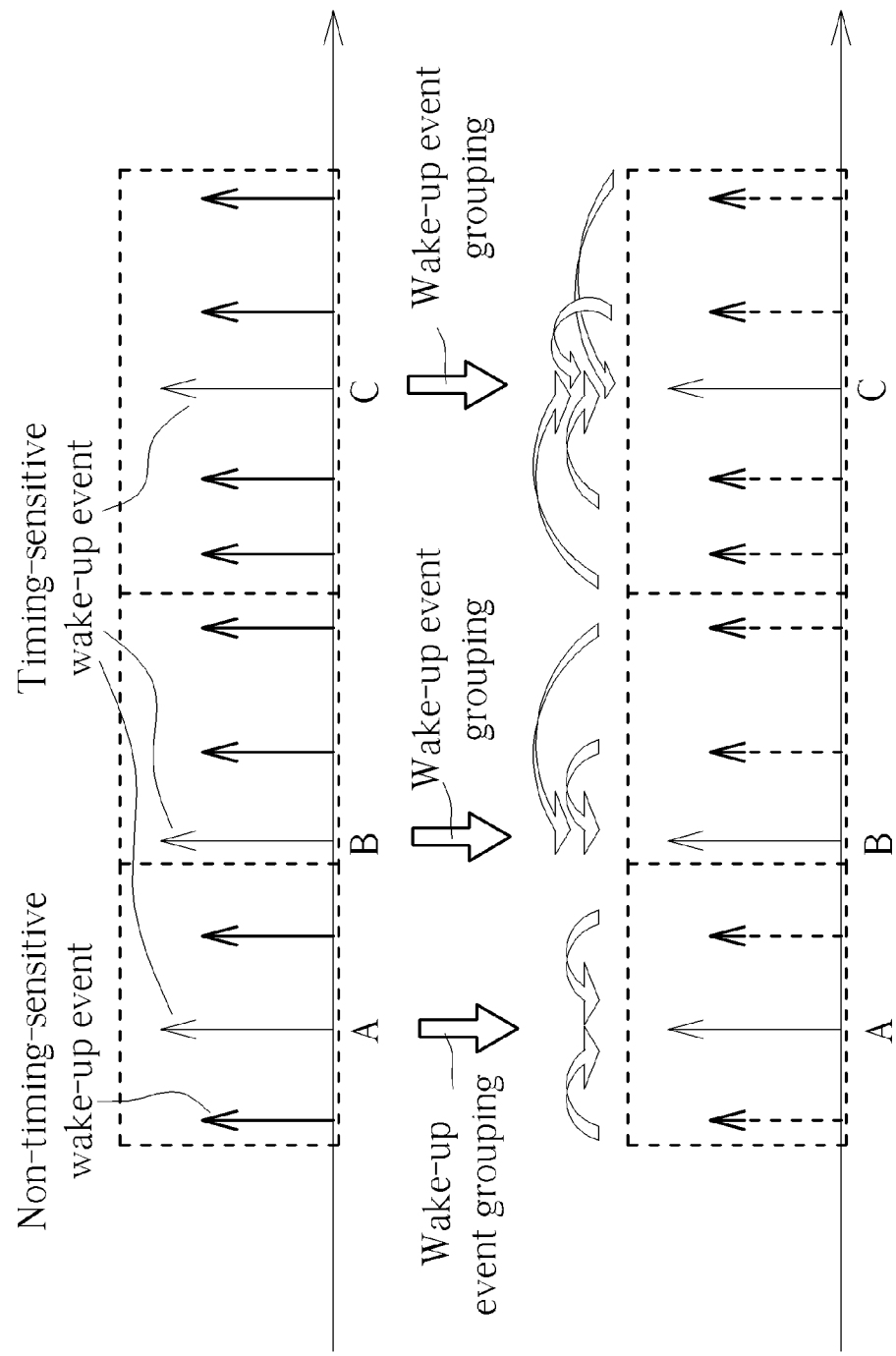
FIG. 4 illustrates a wake-up event control scheme involved with the method shown in FIG. 3 according to an example.

FIG. 4 illustrates a wake-up event control scheme involved with the method 300 shown in FIG. 3 according to an example, where the horizontal axis in any of the lower half and the upper half of FIG. 4 represents time, and wake-up events are illustrated with upward arrows. As shown in the upper half of FIG. 4, there are some timing-sensitive wake-up events such as those labeled "A", "B", and "C", respectively, and some non-timing-sensitive wake-up events such as the others shown in the upper half of FIG. 4.

In this example, the non-timing-sensitive wake-up events may represent the wake-up events that can be modified or delayed without seriously affecting the function. This kind of events can be sent earlier or later and can be regarded as non-timing-sensitive wake-up events. The processing circuit 110 may merge some of the non-timing-sensitive wake-up events together and perform the corresponding operations at the same time when the triggering condition is found. For example, the triggering condition can be a triggering event such as that mentioned above. In addition, the timing-sensitive wake-up events may represent some wake-up events that are important to the whole system or may impact the user's feeling, and can be utilized as the aforementioned triggering events. Examples of the timing-sensitive wake-up events may include, but not limited to, the above mentioned software wake-up events and the above mentioned hardware wake-up events.

As shown in the upper half of FIG. 4, any of the timing-sensitive wake-up events A, B, and C can be taken as an example of the triggering event mentioned in Step 320, where each corresponding box depicted with dashed lines (i.e. the box surrounding the triggering event under consideration in the upper half of FIG. 4) may represent the aforementioned predetermined time interval corresponding to the wake-up time of the triggering event. Taking the timing-sensitive wake-up event C as an example of the triggering event, the rightmost box in the upper half of FIG. 4 may represent the aforementioned predetermined time interval corresponding to the wake-up time of the triggering event (e.g. the timing-sensitive wake-up event C). As shown in the lower half of FIG. 4, some neighboring wake-up events of the timing-sensitive wake-up event C can be grouped, where the grouping operation in Step 320 can be applied to these neighboring wake-up events of the timing-sensitive wake-up event C. In this example, some neighboring wake-up events of the timing-sensitive wake-up event B can be grouped, where the grouping operation in Step 320 can be applied to these neighboring wake-up events of the timing-sensitive wake-up event B. Similarly, some neighboring wake-up events of the timing-sensitive wake-up event A can be grouped, where the grouping operation in Step 320 can be applied to these neighboring wake-up events of the timing-sensitive wake-up event A. Similar descriptions are not repeated in detail here.

Figure 5:
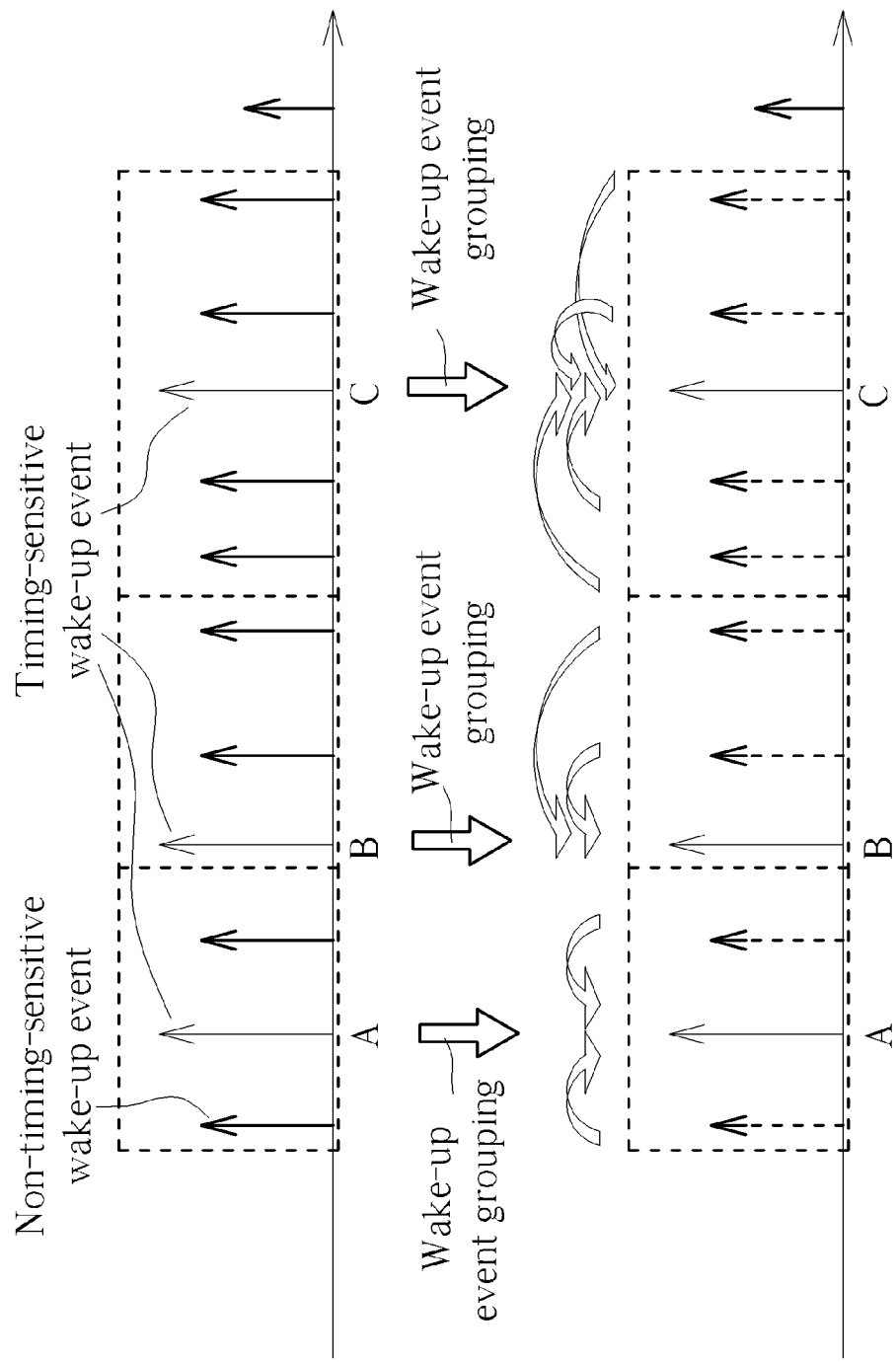
FIG. 5 illustrates a wake-up event control scheme involved with the method shown in FIG. 3 according to another example.

FIG. 5 illustrates a wake-up event control scheme involved with the method 300 shown in FIG. 3 according to another example, where the horizontal axis in any of the lower half and the upper half of FIG. 5 represents time, and wake-up events are illustrated with upward arrows. As shown in the upper half of FIG. 5, the timing-sensitive wake-up events A, B, and C can be the same as those mentioned in the example shown in FIG. 4, respectively, and the non-timing-sensitive wake-up events can be the same as those mentioned in the example shown in FIG. 4, respectively, where the rightmost wake-up event in the upper half of FIG. 5 can be taken as an example of the aforementioned non-grouping event, which is not within a group corresponding to any triggering event. Similar descriptions are not repeated in detail here.

FIG. 6 illustrates a table involved with the method 300 shown in FIG. 3 according to an example. The table shown in FIG. 6 can be implemented for the classifying operation in Step 310. For example, the table shown in FIG. 6 can be generated and handled by an application running on the electronic device. For example, in order to generate the table shown in FIG. 6, the application may check the attribute information of wake-up events or applications to classify the wake-up events. This is for illustrative purposes only, and is not meant to be a limitation. According to a variation of this example, the table shown in FIG. 6 can be generated and handled by an operating system (OS) running on the electronic device. According to a variation of this example, the table shown in FIG. 6 can be defined by the user or the manufactory of the electronic device. According to a variation of this example, the table shown in FIG. 6 can be integrated into the OS running on the electronic device.

In the table shown in FIG. 6, each row corresponds to a wake-up event that has been classified in Step 310. In addition, the column labeled "Name" represents the application that the wake-up event under consideration belongs to (e.g. any of the applications APP1_name, APP2_name, APP3_name, APP4_name, etc.), and the column labeled "Sub_name" represents the sub-name of multiple different wake-up events corresponding to this application (e.g. any of the sub-names ID1, ID2, etc.) in a situation where there are multiple wake-up events for this same application. Please note that the notation "X" (which stands for "Don't care") in any of the last three rows of the table shown in FIG. 6 indicates that there is no sub-name corresponding to the application under consideration (e.g. the application APP2_name or the application APP3_name or the application APP4_name) since there is only one (or even no, in some variations of this example) wake-up event for this application. Additionally, the column labeled "Wake-up event type" represents the type of the wake-up event under consideration (e.g. any of the types ET1, ET2, ET3, ET4, etc.), which can be taken as an example of the classified result of Step 310. For example, the type ET1 may indicate that the wake-up event under consideration is classified as the grouping event. In another example, the type ET2 may indicate that the wake-up event under consideration is classified as the non-grouping event mentioned above. In another example, the type ET3 may indicate that the wake-up event for the application APP3 name is classified as a triggering event. Similar descriptions are not repeated in detail here. The application or OS determines how to merge these wake-up events according to this table.

In practice, the grouping events may further comprise at least one queue-in event such as one or more queue-in events. Typically, each queue-in event of the aforementioned at least one queue-in event is queued in a waiting pool when it (i.e. the aforementioned each queue-in event) is created. For example, the type ET4 may indicate that the wake-up event for the application APP4_name is classified as a queue-in event. When a queue-in event such as one of the aforementioned one or more queue-in events is created (e.g. by application), it is queued in a waiting pool regardless the corresponding wake-up time till a coming triggering event (e.g. the triggering event mentioned above). When any triggering event such as that mentioned above is created or triggered (e.g. in a situation where the triggering event mentioned above is an email synchronization event or a hardware wake-up event), the processing circuit 110 determines whether any queue-in event is queued in the waiting pool. When it is detected that the aforementioned at least one queue-in event is queued in the waiting pool, the processing circuit 110 performs at least one operation corresponding to the aforementioned at least one queue-in event (e.g. a set of the queue-in events) at the same time as the triggering event is performed (e.g. the aforementioned at least one operation corresponding to the aforementioned at least one queue-in event and the operation corresponding to the triggering event are performed at the same time). Noticeably, in order not to impact user experience, the queue-in event may be released from the waiting pool and forced to be performed in some conditions (e.g. the display panel of the electronic device is on) without waiting for the trigger events while the corresponding wake-up time has expired.

According to an example, there are two sets of periodic wake-up events to be processed, such as the aforementioned first set of periodic wake-up events whose period should be equal to the first predetermined value mentioned above (e.g. five minutes) and the aforementioned second set of periodic wake-up events whose period should be equal to the second predetermined value mentioned above (e.g. one minute). In first situation where one of the conventional methods mentioned above is applied to the two sets of periodic wake-up events, disorder of one of the sets of periodic wake-up events is introduced. More particularly, the conventional method may use a periodic wake-up event of the first set of periodic wake-up events to trigger a periodic wake-up event of the second set of periodic wake-up events, causing the period of the second set of periodic wake-up events to erroneously become the first predetermined value. In second situation, the conventional method may use a periodic wake-up event of the second set of periodic wake-up events to trigger a periodic wake-up event of the first set of periodic wake-up events, causing the period of the first set of periodic wake-up events to erroneously become the second predetermined value. In comparison with this, the aforementioned method, the aforementioned apparatus, and the aforementioned computer program product can provide optimized timing control of the two sets of periodic wake-up events in the electronic device by classifying wake-up events to timing-sensitive wake-up events and non-timing-sensitive wake-up events such as triggering events, grouping events and queue-in events, where the related art problem (e.g. the conventional methods may cause disorder of a set of periodic wake-up events) can be prevented.

According to an aspect, the aforementioned computer program product can be composed of several code segments. In addition, after these code segments are loaded into the apparatus 100 (more particularly, the processing circuit 110) and are executed, the steps and features of the method shown in FIG. 3 can be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing application wake-up event management, the method being applied to an electronic device, the method comprising the steps of:

classifying a plurality of application wake-up events of the electronic device according to at least one predetermined rule, wherein a specific application wake-up event of the plurality of application wake-up events is classified to be a triggering event, and one or more other application wake-up events of the plurality of application wake-up events are classified to be grouping events;

arranging the grouping events as a group corresponding to the triggering event by modifying a default application wake-up time of each of the grouping events to be equivalent to the application wake-up time of the triggering event, for triggering the grouping events by utilizing the triggering event;

entering a power saving state of the electronic device; and in response to both the application wake-up time of the triggering event and the modified default application wake-up time of the grouping events being reached at the same time in the power saving state, exiting the power saving state and performing operations corresponding to the triggering event and the grouping events, respectively.

2. The method of claim 1, wherein the at least one predetermined rule make a plurality of timing-sensitive application wake-up events be classified as triggering events, respectively; the plurality of timing-sensitive application wake-up events comprises at least one of a wireless communication event, a display on event, and a hardware interrupt event; and the specific application wake-up event is one of the plurality of timing-sensitive application wake-up events.

3. The method of claim 1, wherein a specific grouping event of the grouping events is created after the triggering event is created; and the step of arranging the grouping events as the group corresponding to the triggering event by setting the application wake-up time of each of the grouping events to be equivalent to that of the triggering event further comprises:

when the specific grouping event is created, directly setting application wake-up time of the specific grouping event to be equivalent to that of the triggering event.

4. The method of claim 1, wherein a specific grouping event of the grouping events is created before the triggering event is created; and the step of arranging the grouping events as the group corresponding to the triggering event by setting the application wake-up time of each of the grouping events to be equivalent to that of the triggering event further comprises:

when the triggering event is created, changing application wake-up time of the specific grouping event to be equivalent to that of the triggering event.

5. The method of claim 1, wherein another application wake-up event of the plurality of application wake-up events is classified to be a non-grouping event; the non-grouping event is not associated with the group corresponding to the triggering event, and is not associated with any other group corresponding to another triggering event; and the method further comprises:

when the application wake-up time of by the non-grouping event is reached, performing an operation corresponding to the non-grouping event.

6. The method of claim 1, further comprising:

checking whether an application wake-up time of a specific grouping event of the grouping events is scheduled within a predetermined time interval corresponding to the application wake-up time of the triggering event; and when it is detected that the application wake-up time of the specific grouping event is scheduled within the predetermined time interval, setting the application wake-up time of the specific grouping event to be equivalent to that of the triggering event.

7. The method of claim 1, wherein the triggering event and at least one grouping event of the grouping events are wireless communication events that need to synchronize information through wireless communication.

8. The method of claim 1, wherein the grouping events comprise at least one queue-in event, and each queue-in event of the at least one queue-in event is queued in a waiting pool when said each queue-in event is created; and the method further comprises:

when the triggering event is created or triggered, determining whether any queue-in event is queued in the waiting pool; and when it is detected that the at least one queue-in event is queued in the waiting pool, performing at least one operation corresponding to the at least one queue-in event at a same time as the triggering event is performed.

9. An apparatus for performing application wake-up event management, the apparatus comprising at least one portion of an electronic device, the apparatus comprising:

a wake-up control circuit arranged to wake up the electronic device according to at least one application wake-up event; and a processing circuit, coupled to the wake-up control circuit, arranged to control operations of the electronic device, and further arranged to classify a plurality of application wake-up events of the electronic device according to at least one predetermined rule, wherein a specific application wake-up event of the plurality of application wake-up events is classified to be a triggering event, and one or more other application wake-up events of the plurality of wake-up events are classified to be grouping events;

wherein the processing circuit arranges the grouping events as a group corresponding to the triggering event by modifying a default application wake-up time of each of the grouping events to be equivalent to the application wake-up time of the triggering event, for triggering the grouping events by utilizing the triggering event; and after a power saving state of the electronic device is entered, in response to both the application wake-up time of the triggering event and the modified default application wake-up time of the grouping events being reached at the same time in the power saving state, the electronic device exits the power saving state and the processing circuit performs operations corresponding to the triggering event and the grouping events, respectively.

10. The apparatus of claim 9, wherein the at least one predetermined rule make a plurality of timing-sensitive application wake-up events be classified as triggering events, respectively; the plurality of timing-sensitive application wake-up events comprises at least one of a wireless communication event, a display on event, and a hardware interrupt event; and the specific wake-up event is one of the plurality of timing-sensitive application wake-up events.

11. The apparatus of claim 9, wherein a specific grouping event of the grouping events is created after the triggering event is created;

and when the specific grouping event is created, the processing circuit directly sets application wake-up time of the specific grouping event to be equivalent to that of the triggering event.

12. The apparatus of claim 9, wherein a specific grouping event of the grouping events is created before the triggering event is created; when the triggering event is created, the processing circuit changes application wake-up time of the specific grouping event to be equivalent to that of the triggering event.

13. The apparatus of claim 9, wherein another application wake-up event of the plurality of application wake-up events is classified to be a non-grouping event; the non-grouping event is not associated with the group corresponding to the triggering event, and is not associated with any other group corresponding to another triggering event; and when the application wake-up time of the non-grouping event is reached, the processing circuit performs an operation corresponding to the non-grouping event.

14. The apparatus of claim 9, wherein the processing circuit checks whether an application wake-up time of a specific grouping event of the grouping events is scheduled within a predetermined time interval corresponding to the application wake-up time of the triggering event; and when it is detected that the application wake-up time of the specific grouping event is scheduled within the predetermined time interval, the processing circuit sets the application wake-up time of the specific grouping event to be equivalent to that of the triggering event.

15. The apparatus of claim 9, wherein the triggering event and at least one grouping event of the grouping events are wireless communication events that need to synchronize information through wireless communication.

16. The apparatus of claim 9, wherein the grouping events comprise at least one queue-in event, and each queue-in event of the at least one queue-in event is queued in a waiting pool when said each queue-in event is created; when the triggering event is created or triggered, the processing circuit determines whether any queue-in event is queued in the waiting pool; and when it is detected that the at least one queue-in event is queued in the waiting pool, the processing circuit performs at least one operation corresponding to the at least one queue-in event at a same time as the triggering event is performed.

17. A non-transitory computer-readable medium, having program instructions for instructing a processor of an electronic device to perform a method comprising the steps of:

classifying a plurality of application wake-up events of the electronic device according to at least one predetermined rule, wherein a specific application wake-up event of the plurality of application wake-up events is classified to be a triggering event, and one or more other application wake-up events of the plurality of application wake-up events are classified to be grouping events;

arranging the grouping events as a group corresponding to the triggering event by modifying a default application wake-up time of each of the grouping events to be equivalent to the application wake-up time of the triggering event, for triggering the grouping events by utilizing the triggering event;

entering a power saving state of the electronic device; and in response to both the application wake-up time of the triggering event and the modified default application wake-up time of the grouping events being reached at the same time in the power saving state, exiting the power saving state and performing operations corresponding to the triggering event and the grouping events, respectively.

* * * * *